Oct. 22, 1929.  D. R. CAPES  1,733,051
SEAT SPRING
Filed March 6, 1928
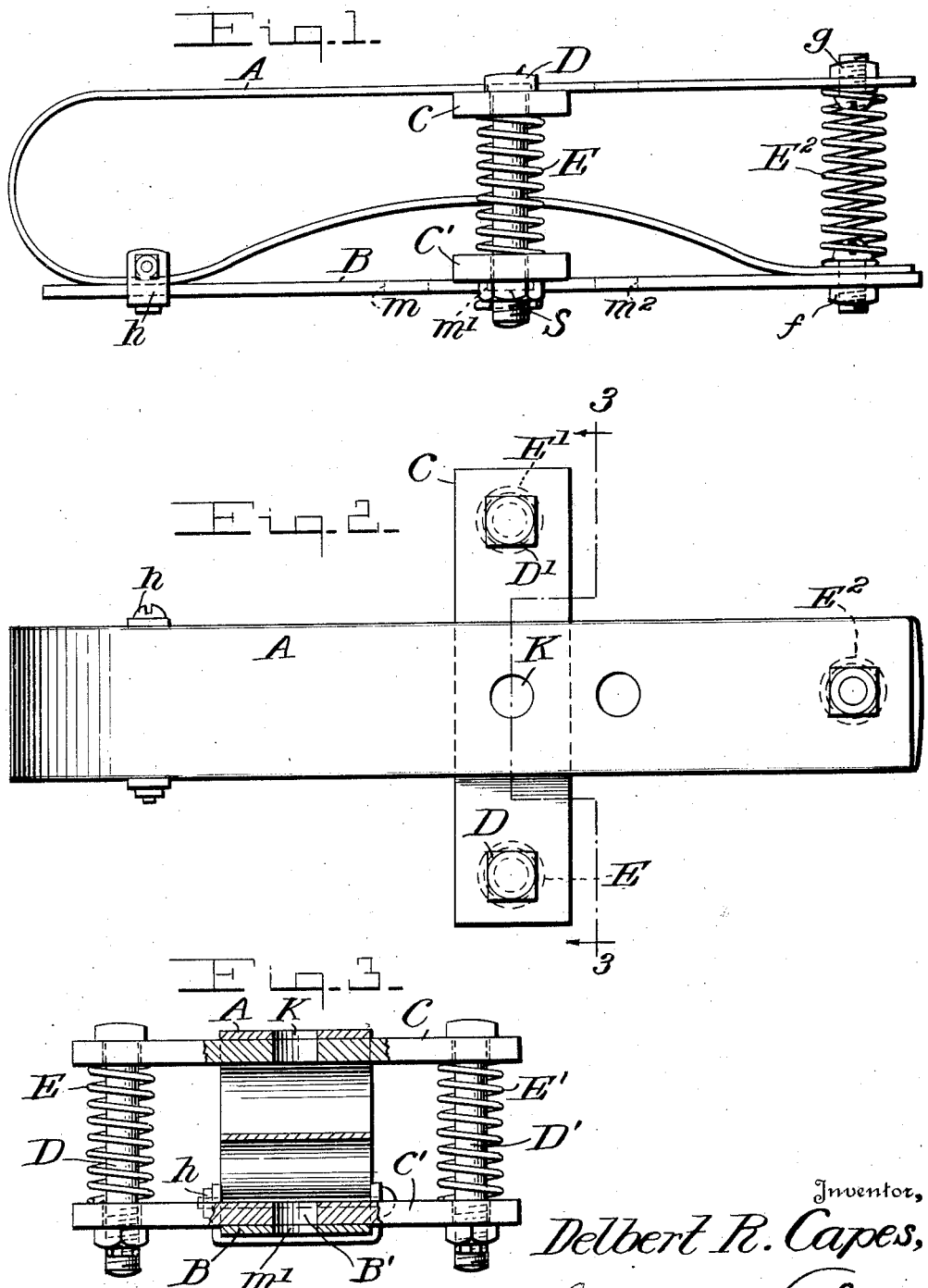
Inventor,
Delbert R. Capes,
By Medwin Wight
Attorneys.

Patented Oct. 22, 1929

1,733,051

UNITED STATES PATENT OFFICE

DELBERT R. CAPES, OF PONTIAC, ILLINOIS

SEAT SPRING

Application filed March 6, 1928. Serial No. 259,463.

My invention relates to improvements in springs for the seats of farm machinery and generally aims to provide an easy-riding, self-aligning spring combination for use in conjunction with the ordinary flat spring furnished by the manufacturer.

I attain these objects by the mechanism illustrated by the accompanying drawing wherein Figure 1 is a side view of the spring device; Figure 2 is a top view of the same and Figure 3 is a transverse sectional view taken on the line 3—3 of Figure 2. Referring specifically to the drawings, B represents a flat, oblong piece of steel to which a generally U-shaped steel spring A has its lower cambered leg bolted or anchored at $f$. This spring passes through clip $h$, which holds it in place, but allows it to slide free when necessary. Two cross bars C and $C^1$ cross at right angles to plate B and spring A, as shown. Interposed between plates C and $C^1$ at the outer ends, are springs E and $E^1$, as shown in full lines in Figure 1 and in dotted lines in Figure 2, through which bolts D and $D^1$ pass, as shown. The middle of plate $C^1$ as well as the flat oblong piece of steel, B, is drilled with a hole and Figure 3 is a transverse sectional view taken on the line 3—3 of Figure 2 which allows same to be bolted to the ordinary flat seat spring. The center of cross piece C as well as the upper leg of spring A is drilled to provide openings, as shown at $k$, Figure 2, whereby the seat may be bolted to the spring device. Spring $E^2$ is held between the heads of bolts F and G, as shown in Figure 1.

Spring E provides additional support for spring A at the forward end, thus preventing any undesirable forward movement of seat when attached to seat spring mechanism. When weight is applied the seat by the operator, the spring A is depressed, which in turn depresses springs E, $E^1$, and $E^2$, according to the weight and position of the occupant. The bolts D and $D^1$ being loosely fitted in holes of plates C and $C^1$ allow free action of the springs E and $E^1$.

A further function of bolts D and $D^1$ is to prevent side tipping of the seat. Either spring may compress but the bolt on the opposite end of cross plates prevents any upward movement.

It will be noted that by adjusting the nuts S and $S^1$ on the bolts D and $D^1$, that it not only adjusts the coil springs E, $E^1$ and $E^2$, but also the flat steel spring A.

It is also possible to adjust this seat spring device forward or backward, as there are three holes in base plate B, shown at $m$, $m^1$, $m^2$, Figure 1.

Having described my invention what I claim is:

1. A seat spring comprising a base plate, a spring member generally of U-shape in side elevation having its lower leg cambered, means anchoring one end of said leg to the base plate, the other end of said lower leg being slidable on the base plate, a cross bar engaging the upper leg of the spring, and cushioning spring means for said cross bar.

2. A seat spring comprising a base plate, a spring member generally of U-shape in side elevation having its lower leg cambered and slidably mounted at a portion thereof on said plate, a cross bar engaging the upper leg of said spring member, a cross bar engaging said base plate, bolts passing through the cross bars, and cushioning springs mounted by the bolts intermediate the cross bars.

3. A seat spring comprising a base plate, a spring member generally of U-shape in side elevation having its lower leg cambered, means anchoring one end of said leg to the base plate, a cross bar engaging the upper leg of the spring, cushioning spring means for said cross bar, and cushioning spring means between the upper and lower legs of the spring member adjacent the free ends of said legs.

4. A seat spring comprising a base plate, a spring member generally of U-shape arranged so that one leg will be above the other, the lower leg being cambered, means securing the lower leg adjacent its free end to the base plate, means for guiding the other end of the lower leg for sliding on the base plate, a cross bar engaging the upper surface of the base plate, a cross bar engaging the under surface of the upper leg of the spring member, said cross bars extending laterally beyond the spring member, bolts joining said cross bars adjacent their outer ends, and cushioning springs on said bolts and abutting said cross bars.

DELBERT R. CAPES.